(12) United States Patent
Jeddeloh

(10) Patent No.: US 6,513,090 B1
(45) Date of Patent: Jan. 28, 2003

(54) BIDIRECTIONAL DATA TRANSFER DURING BUFFER FLUSHING OPERATIONS

(75) Inventor: Joseph M. Jeddeloh, Minneapolis, MN (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/283,335

(22) Filed: Mar. 31, 1999

(51) Int. Cl.[7] .............................................. G06F 13/36
(52) U.S. Cl. ...................................................... 710/310
(58) Field of Search ................................. 710/306, 310, 710/309, 311; 711/147, 150, 151

(56) References Cited

U.S. PATENT DOCUMENTS

| | | | | | |
|---|---|---|---|---|---|
| 5,761,450 | A | * | 6/1998 | Shah | 710/107 |
| 5,983,304 | A | * | 11/1999 | Jin | 710/100 |
| 6,078,976 | A | * | 6/2000 | Obayashi | 710/113 |
| 6,247,102 | B1 | * | 6/2001 | Chin et al. | 711/150 |
| 6,324,612 | B1 | * | 11/2001 | Chen et al. | 710/112 |

* cited by examiner

Primary Examiner—Hiep T. Nguyen
(74) Attorney, Agent, or Firm—Trop, Pruner & Hu, P.C.

(57) ABSTRACT

A computer system bridge circuit that allows for the bidirectional flow of data through itself during a write buffer flushing operation is described. In addition, a buffer structure supportive of this bidirectional flow of data is described.

41 Claims, 3 Drawing Sheets

BIDIRECTIONAL DATA TRANSFER DURING BUFFER FLUSHING OPERATIONS

BACKGROUND

The invention relates generally to data transfer operations within a computing system and, more particularly, to bidirectional data transfer operations during bridge circuit buffer flushing operations.

In some computing systems, device may coordinate the transfer of data via a series of read and write ops through an intermediary device. One such intermediary device is a processor-to-bus bridge circuit. Referring to FIG. 1 for example, computer system 100 includes system memory 102, host processor 104, bridge circuit 106, system bus 108, and bus device 110. Bridge circuit 106 typically includes memory interface 112 for communicating with system memory 102, processor interface 114 for communicating with processor 104, bus interface 116 for communicating with bus 108, and control circuit 118 to coordinate the transfer of information between memory interface 112 and/or processor interface 114 and bus interface 116. Each interface within bridge circuit 106 may include one or more buffers/caches to facilitate the exchange of data through bridge circuit 106. Bus interface 116, for example, may include a first set of read and write buffers to facilitate data transfers between a bus device (e.g. device 110) and system memory 112, and a second set of read and write buffers to facilitate data transfers between a bus device (e.g. device 110) and processor 104.

One standard approach to exchanging data between processor 104 and bus device 110 includes the use of semaphores, which are typically stored in system memory 102. Consider, for example, the transfer of information from processor 104 to bus device 110. Initially, processor 104 may cause the data destined for bus device 110 to be written into a write buffer in bus interface 116. (Data placed in a write buffer but not yet delivered to its destination is said to be "posted.") Next, processor 104 may update one or more semaphores in system memory 102 to indicate it has completed its portion of a write-data-to-bus-device operation. If bus device 110 is allowed to read the state of those semaphores updated by processor 104 before the previously posted data is delivered, bus device 110 may incorrectly determine that the data has in fact been delivered. Such a situation can lead to data corruption.

To prevent this situation from occurring, computer system communication protocols typically enforce transaction ordering. In a computer system operating in accordance with the Peripheral Component Interface (PCI) standard for example, transaction ordering ensures that writes from one bus master (e.g. processor 104) anywhere in computer system 100 are observable by another bus master (e.g., bus device 110) in the order generated by the initiating bus master. (See the "Peripheral Component Interface Local Bus Specification," Revision 2.1, 1995.)

Bridge circuits designed in accordance with PCI-type transaction ordering rules typically flush the off-device's write buffer on the occurrence of a read synchronization event. For example, if processor 104 issues a read request to bus device 110 (a read synchronization event), that write buffer within bus interface 116 associated with bus-device-to-memory data transfers may be flushed. Alternatively, if bus device 110 issues a read request to system memory 102 (a read synchronization event), that write buffer within bus interface 116 associated with processor-to-bus-device data transfers may be flushed. During a flush operation, data is transferred from the write buffer being flushed to system memory 102 (if processor 104 issued the synchronizing read request) or bus 108 (if a bus device, 110, for example, issued the synchronizing read request). During flushing operations, control circuit 118 prevents new data from entering bridge circuit 106. That is, while data is being flushed to system memory 102, processor 104 and bus device 110 are blocked from transferring data to or from bridge circuit 106. Similarly, while data is begin flushed to bus 108, system memory 102 and processor 104 are blocked from transferring data to or from bridge circuit 106.

Conventional buffer flushing operations tend to reduce that effective data transfer rate/bandwidth between various system components by halting some on going transfers and preventing some others from beginning. This reduction may adversely affect system performance. Thus, there is a need for techniques that flush data transfer buffers without unnecessarily restricting other data transfer operations.

SUMMARY

In one embodiment, the invention provides a computer system bridge circuit adapted to allow the bidirectional flow of data through itself during a write buffer flushing operation. In another embodiment, the invention provides a buffer structure supportive of this bidirectional flow of data. In still another embodiment, the invention provides a method by which a computer system bridge circuit may provide the aforementioned bidirectional data flow capability.

BRIEF DESCRIPTION OF THE DRAWINGS

FIG. 2 shows a computer system having a bridge that provides bidirectional data transfer capability during buffer flush operations in accordance with one embodiment of the invention to.

DETAILED DESCRIPTION

Techniques (methods and devices) to allow the bidirectional transfer of data in a computer system bridge circuit during buffer flushing operations are described. The following embodiments of the invention, described in terms of a processor Peripheral Component Interface (PCI) bus bridge circuit, are illustrated only and are not to be considered limiting in any respect.

Figure 2:
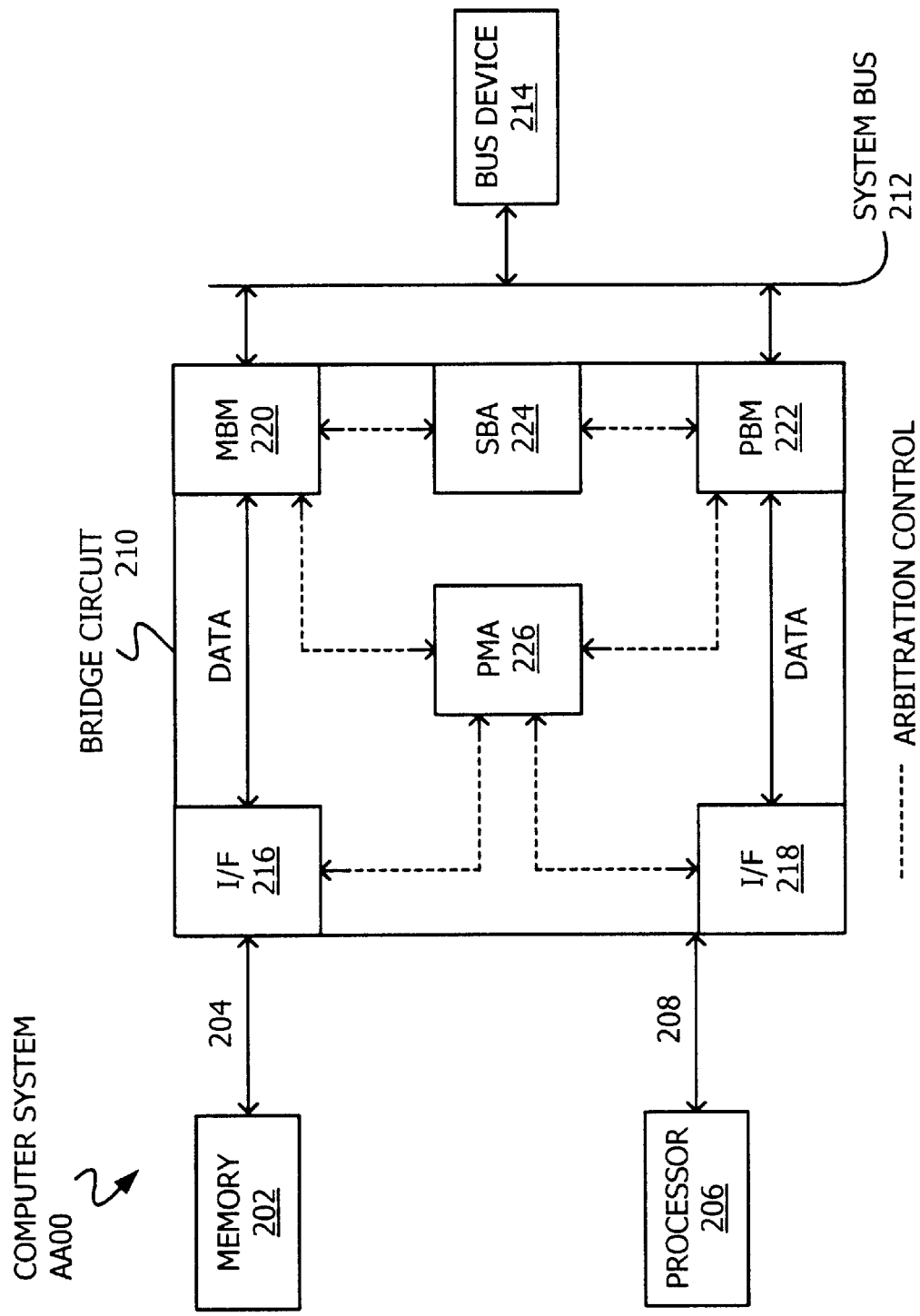

Referring to FIG. 2, computer system 200 provides bidirectional data flow capability during bridge circuit buffer flushing operations. Illustrative computer system 200 includes system memory 202, memory bus 204, processor 206, processor bus 208, bridge circuit 210, system bus 212, and bus device 214. Typical bus devices include video control cards, network interface control cards, and graphics control cards. Bus device 214 may be a bus master device (capable of initiating a bus transaction) and/or a bus target device (capable of responding to a bus master initiated transaction). Bridge circuit 210 may include: memory interface 216 for communicating with system memory 202 via memory bus 204; processor interface 218 for communicating with processor 206 via processor bus 208; memory bus module (MBM) 220 for transferring data between memory interface 216 and system bus 212; processor-bus module (PBM) 222 for transferring data between processor interface 218 and system bus 212; system bus arbiter (SBA) 224 to selectively determine which of MBM 220 and PBM 224 may seize system bus 212; and processor-memory arbiter (PMA) 226 to selectively determine which of MBM 220 and PBM 222 is allowed to transfer data to/from its associated interface (MBM 220 and PBM respectively). Each of MBM 220 and PBM B22 includes read and write buffers to facilitate data transfer operations between system bus 212 and system memory 202 and processor 206. If system bus 212 is a PCI bus, MBM 220 may be referred to as a PCI target and PBM 220 may be referred to as a PCI master.

Under control of SBA 224 and PMA 226, data may continue to flow between bridge circuit 210 to/from multiple other system components during a buffer flushing operation. For example, if write data is being flushed from MBM 220 to system memory 220 (via memory interface 216 and memory bus 204) in response to a read request directed to a device on system bus 212 (i.e., synchronizing read request) from processor 204, data may continue to be transferred between processor 204 and PBM 222 (via memory bus 208 and processor interface 218) and/or between bridge circuit 210 (MBM 220 or PBM 222) and system bus 212. Similarly, if write data is being flushed from PBM 222 to system bus 212 in response to a bus device's (e.g. 214) memory read request (a synchronizing read request), data may continue to flow between bridge circuit 210 and system memory 202 and/or processor 206.

Figure 3:
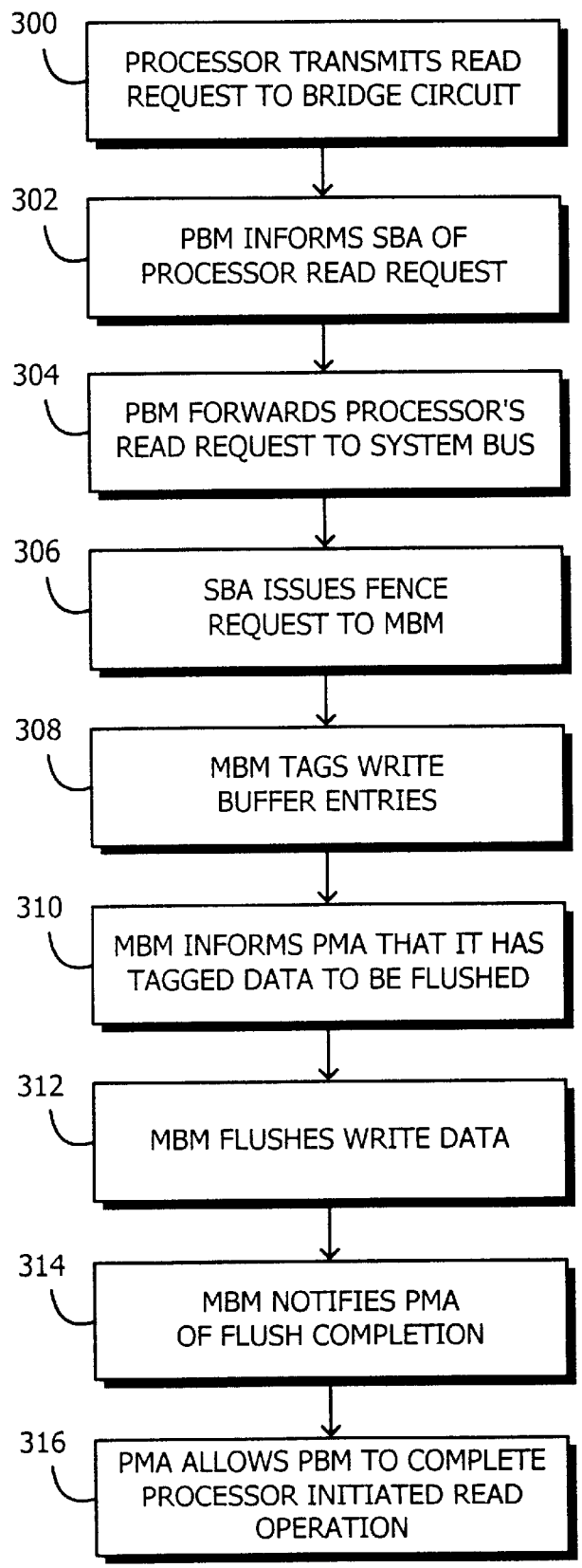
FIG. 3 shows a flowchart of a data transfer method in accordance with one embodiment of the invention.

Data flow through bridge circuit 210 in accordance with the invention may be understood by considering what happens when a bus master device (e.g., processor 206 or device 214) issues a synchronizing read request. For instance, a flowchart outlining the flow of data through bridge circuit 210 in response to a processor initiated read request (directed, for example, to bus device 214) is shown in FIG. 3. Initially, processor 206 seizes processor bus 208 and transmits a read request to PBM 222 via interface 218 (block 300) which informs SBA 220 of the read request (block 302). SBA 224 grants PBM 220 access to system bus 212 which then transmits the read request to device 214 via system bus 212 (block 302).

At substantially the same time that SBA 224 grants PBM 222 access to system bus 212, SBA 224 issues a fence request signal to MBM 220 (block 306). MBM 220 then fence's its write buffer by assigning a tag value to each data entry in its write buffer; that is, to each entry in MBM 220's write data buffer that contains active (i.e., unflushed) data (block 308). In one embodiment, the tag value may be a binary value. In another embodiment, the tag value may uniquely identify the read request that caused the fence action. In this latter embodiment, the tag value may be provided by PBM 222 (via SBA 224) which may also provide indication and identification of the synchronizing read request to PMA 226.

Figure 1:
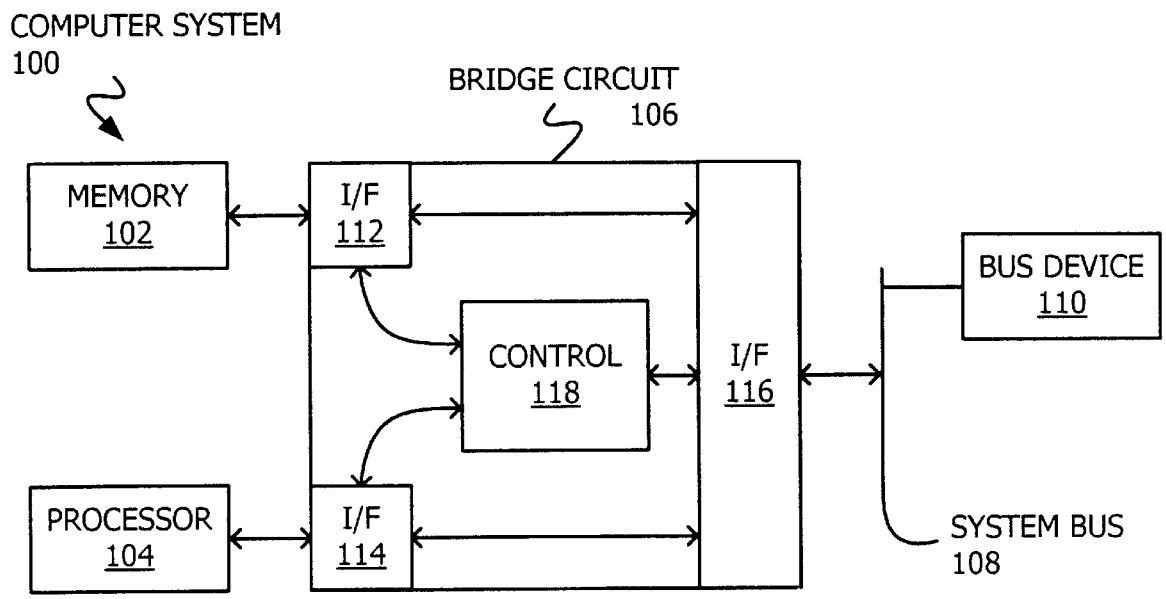
FIG. 1 shows a prior art computer system in which data transfer between two or more devices are coordinated through a bridge circuit.
Figure 4:
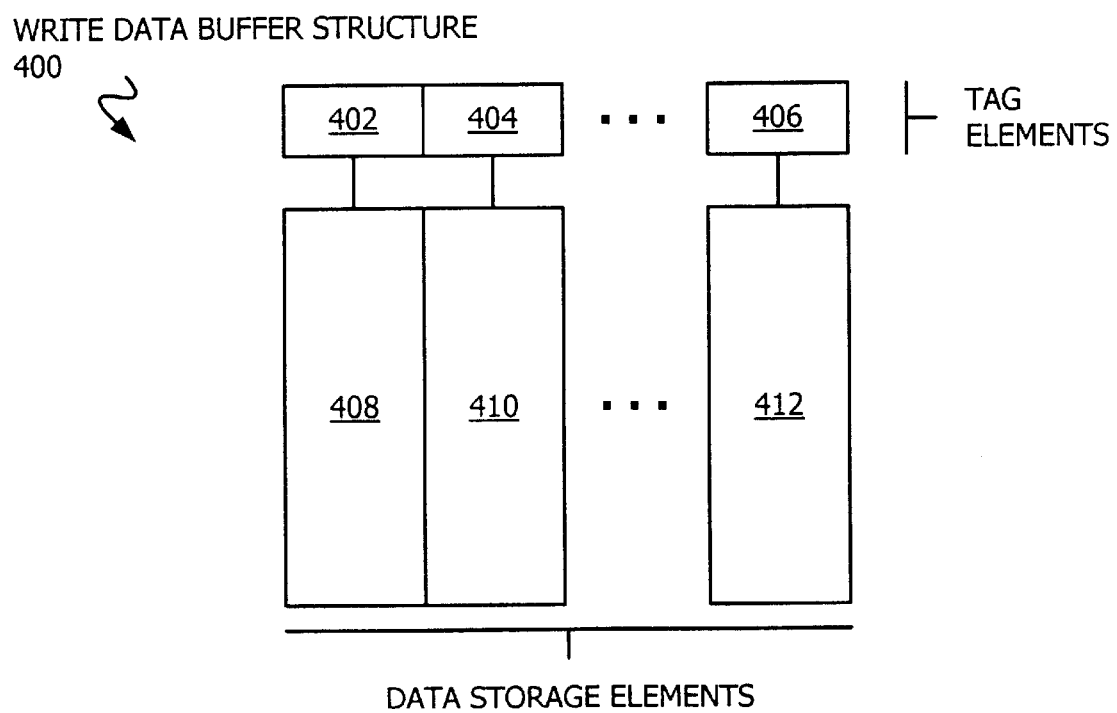
FIG. 4 shows a buffer structure in accordance with one embodiment of the invention.

Referring to FIG. 4, a write data buffer structure 400 in accordance with one embodiment of the invention comprises tags (e.g., 402, 404 and 406) and write data storage elements (e.g., 408, 410 and 412). Each storage element has a corresponding tag element. As indicated, tag elements 402, 404 and 406 may be independent of their corresponding write data storage element 408, 410 and 412 respectively. This independence may allow the detection, matching and processing of tagged entries without the need to access/read the contents (i.e., data) of write data buffer 400.

Referring again to FIG. 3, when MBM 220 completes the tagging operation it informs PMA 226 it has fenced data that needs to be flushed (block 310). In an embodiment that uses binary tags, PMA 226 may increment a MBM flush counter so that it knows how many outstanding write flushes MBM 220 has generated. In an embodiment using tags that uniquely identify a synchronizing read request, MBM 220 may provide the tag (i.e., read request identifier) to PMA 226 so that it (PMA 226) may track which read request flushes are pending and perhaps, which read request flushes have been completed.

Through PMA 226/MBM 220 interaction (via arbitration control signals, for example) MBM 220 transfers its write data buffer contents to system memory 202 via interface 216 and memory bus 204 (block 312). In contrast to prior art bridge circuit arbitration units, PMA 226 may grant MBM 220 access to memory bus 204 on a priority basis. Also in contrast to prior art bridge circuits, data (including data transfer requests) may flow bidirectionally between processor 206 and PBM 222 and system bus 212 and MBM 220 and/or PBM 222 during the MBM write data buffer flush operation (i.e., the acts of block 312). Individually and in combination, these two features may provide increased data transfer throughput over prior art bridge circuits.

In one embodiment, MBM 220 informs PMA 226 when it has completed flushing those write data buffer entries associated with a first tag (block 314). In another embodiment, MBM 220 informs PMA 226 when it has completed flushing all tagged entries in it write data buffer (block 314). In an embodiment, of bridge circuit 210 using binary tag values, PMA 226 may decrement a MBM flush counter so that it may determine if MBM 220 has additional buffer flush requests pending. With this information, PMA 226 may selectively allow PBM 222 to complete one or more read request; that is, transfer data from a read data buffer within PBM 222 to processor 206 (block 316). In an embodiment which uses tags that uniquely identify read requests, MBM 220 may inform PMA 226 that a flush operation for a specific read request has completed. With this information, PMA 226 may selectively allow PBM 222 to complete the identified read request; i.e., transfer read data received by PBM 222 from bus device 214, in response to the read request transmitted during the acts of block 302, to processor 206 (block 316).

It will be recognized that the processor initiated synchronizing read operation described above and in FIG. 3 has its dual in a bus device initiated synchronizing read operation. For example, if bus device 214 issues a read request to system memory 202, a write data buffer in PBM 222 would be flushed to SYSTEM BUS 212. In contrast to the prior art, data may continue to flow bidirectionally through bridge circuit 210 (between memory 202 and MBM 220 and/or between PROCESSOR 206 and PBM 222) during a write buffer flushing operation.

Techniques in accordance with the invention allow the bidirectional flow of data through a bridge circuit during at least a part of a buffer flushing operation. Bidirectional data flow during buffer flushing operations, in turn, may increase a bridge circuits throughput. It will be recognized that any specific implementation of a bridge circuit in accordance with the invention may be different from the illustrative embodiments described above. For example, bridge circuit 210 may include separate arbiter modules for a memory (e.g., system memory 202) and a processor (e.g., processor 206) rather than combined arbiter module 226. In addition, system bus 212 may have additional device coupled to it including another bridge circuit for communication with a second bus. The second bus may be the same type as system bus 212 or a different type. Further, the second bridge circuit may also operate in accordance with the invention.

Acts in accordance with FIG. 3 may be performed by a programmable control device(s) executing instructions organized into one or more modules. Device suitable for storing or otherwise tangibly embodying instructions include all forms of non-volatile memory including, but not limited to semiconductor elements such as EPROM, EEPROM and flash memory. A programmable control device may be a custom designed state machine(s) within bridge circuit 210.

Thus, while the invention has been disclosed with respect to a limited number of embodiments, numerous modifications and variations will be appreciated by those skilled in the art. It is intended, therefore, that the following claims cover all such modifications and variations that may fall within the true spirit and scope of the invention.

What is claimed is:

1. A computer system bridge circuit comprising:
   a first circuit element to flush a first write buffer; and
   a second circuit element coupled to the first circuit element to cause a second write buffer to receive data during the flush of the first write buffer.

2. The bridge circuit of claim 1, further comprising a third circuit element to cause the first write buffer to receive data during the flush of the first write buffer.

3. The bridge circuit of claim 1, further comprising a third circuit element to transfer data from the second write buffer during the flush of the first write buffer.

4. The bridge circuit of claim 1, further comprising a third circuit element to transfer data from a first read buffer during the flush of the first write buffer.

5. The bridge circuit of claim 4, further comprising a fourth circuit element to cause a second read buffer to receive data during the flush of the first write buffer.

6. The bridge circuit of claim 5, further comprising a fifth circuit element to transfer data from the second read buffer during the flush of the first write buffer.

7. The bridge circuit of claim 1, wherein the first write buffer comprises a bus-memory write buffer and the second write buffer comprises a processor-bus write buffer.

8. The bridge circuit of claim 1, wherein the first write buffer comprises a processor-bus write buffer and the second write buffer comprises a bus-memory write buffer.

9. The bridge circuit of claim 5, wherein the first read buffer comprises a bus-memory read buffer and the second read buffer comprises a processor-bus read buffer.

10. The bridge circuit of claim 5, wherein the first read buffer comprises a processor-bus read buffer and the second read buffer comprises a bus-memory read buffer.

11. The bridge circuit of claim 1, wherein the first write buffer comprises:
    a plurality of write data memory locations; and
    a plurality of tag memory locations independent of the plurality of write data memory locations, each write data memory location having a corresponding tag memory location.

12. The bridge circuit of claim 11, wherein each tag memory location comprises one bit of memory.

13. The bridge circuit of claim 11, wherein each tag memory location comprises a plurality of bits of memory.

14. The bridge circuit of claim 1, wherein the second write buffer comprises:
    a plurality of write data memory locations; and
    a plurality of tag memory locations independent of the plurality of write data memory locations, each write data memory location having a corresponding tag memory location.

15. The bridge circuit of claim 14, wherein each tag memory location comprises one bit of memory.

16. The bridge circuit of claim 14, wherein each tag memory location comprises a plurality of bits of memory.

17. The bridge circuit of claim 1 further comprising a third circuit to couple the bridge circuit to a Peripheral Component Interconnect bus.

18. A computer system bridge circuit, comprising:
    a first write buffer and a first read buffer;
    a second write buffer and a second read buffer; and
    an arbiter to cause data to be flushed from the first write buffer and cause one or more of the following actions during the flush: data to flow into the first write buffer, data to flow out of the first read buffer, data to flow into the second write buffer, data to flow out of the second write buffer, data to flow into the second read buffer, and data to flow out of the second read buffer.

19. The computer system bridge circuit of claim 18, wherein the first write buffer and the first read buffer are associated with a bus-memory data control module and the second write buffer and the second read buffer are associated with a bus-processor data control module.

20. The computer system bridge circuit of claim 19, wherein the bus-memory data control module is adapted to couple to a system bus and a memory bus, and the bus-processor data control module is adapted to couple to the system bus and a processor bus.

21. A computer system bridge circuit write buffer structure, comprising:
    a plurality of write data memory locations; and
    a plurality of tag memory locations independent of the plurality of write data memory locations, each write data memory location having a corresponding tag memory location to indicate a pending synchronizing read operation.

22. The bridge circuit write buffer structure of claim 21, wherein each tag memory location comprises one bit of memory.

23. The bridge circuit write buffer structure of claim 22, wherein the one-bit tag memory location is adapted to indicate at least one synchronizing read operation is pending.

24. The bridge circuit write buffer structure of claim 21, wherein each tag memory location comprises multiple bits of memory.

25. The bridge circuit write buffer structure of claim 24, wherein the multi-bit tag memory location is adapted to uniquely identify a pending synchronizing read operation.

26. A method to allow bidirectional data flow in a bridge circuit during a flush operation, comprising:
    receiving a synchronizing read request;
    forwarding the synchronizing read request to a device and tagging entries in a first write buffer;
    flushing the tagged entries in the first write buffer; and
    allowing data to be received by a second write buffer during the flush of the first write buffer.

27. The method of claim 26, further comprising allowing data to be received by the first write buffer during the flush of the first write buffer.

28. The method of claim 26, further comprising allowing data to be transferred from the second write buffer during the flush of the first write buffer.

29. The method of claim 26, further comprising allowing data to be transferred from a read buffer during the flush of the first write buffer.

30. The method of claim 29, further comprising allowing data to be received by the read buffer during the flush of the first write buffer.

31. The method of claim 26, wherein the act of tagging comprises associating a predetermined tag value with each data entry in the first write buffer.

32. The method of claim 31, wherein the act of associating a predetermined tag value comprises associated a one-bit value with each data entry in the first write buffer.

33. The method of claim 31, wherein the act of associating a predetermined tag value comprises associating a multi-bit value with each data entry in the first write buffer.

34. A computer system, comprising:
   a processor coupled to a processor bus;
   a system memory coupled to a memory bus;
   a device coupled to a system bus; and
   a bridge circuit coupled to the processor bus, the memory bus and the system bus, the bridge circuit adapted to flush a first write buffer in response to a synchronizing read request and to receive data to a second write buffer during the flush of the first write buffer.

35. The computer system of claim 34, wherein the bridge circuit is further adapted to receive data to the first write buffer during the flush of the first write buffer.

36. The computer system of claim 34, wherein the bridge circuit is further adapted to transfer data from the second write buffer during the flush of the first write buffer.

37. The computer system of claim 34, wherein the bridge circuit is further adapted to transfer data from a first read buffer during the flush of the first write buffer.

38. The computer system of claim 37, wherein the bridge circuit is further adapted to receive data to a second read buffer during the flush of the first write buffer.

39. The computer system of claim 38, further adapted to transfer data from the second read buffer during the flush of the first write buffer.

40. The computer system of claim 34, wherein the system bus comprises a Peripheral Component Interface bus.

41. The computer system of claim 34, wherein the device comprises a Peripheral Component Interface bus master device.

* * * * *